US010676099B2

(12) United States Patent
Muehlmann et al.

(10) Patent No.: US 10,676,099 B2
(45) Date of Patent: Jun. 9, 2020

(54) METHOD FOR PROCESSING DATA FOR A DRIVING FUNCTION OF A VEHICLE

(71) Applicant: Robert Bosch GmbH, Stuttgart (DE)

(72) Inventors: Karsten Muehlmann, Stuttgart (DE); Armin Ruehle, Weinstadt (DE); Rainer Baumgaertner, Pfaffenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 15/322,516

(22) PCT Filed: May 12, 2015

(86) PCT No.: PCT/EP2015/060489
§ 371 (c)(1),
(2) Date: Dec. 28, 2016

(87) PCT Pub. No.: WO2016/005085
PCT Pub. Date: Jan. 14, 2016

(65) Prior Publication Data
US 2017/0137035 A1 May 18, 2017

(30) Foreign Application Priority Data
Jul. 8, 2014 (DE) .................. 10 2014 213 245

(51) Int. Cl.
*B60W 50/02* (2012.01)
*G06F 11/16* (2006.01)
(Continued)

(52) U.S. Cl.
CPC ......... *B60W 50/023* (2013.01); *G05D 1/0088* (2013.01); *G06F 11/1687* (2013.01);
(Continued)

(58) Field of Classification Search
CPC ............ B60W 50/023; B60W 2556/00; G06F 11/1687; G06F 2201/83; G06F 11/1641; G06F 11/1004; G05D 1/0088
See application file for complete search history.

(56) References Cited

U.S. PATENT DOCUMENTS

| 2007/0113224 A1 | 5/2007 | Bourdon et al. |
| 2007/0113230 A1 | 5/2007 | Bourdon et al. |

FOREIGN PATENT DOCUMENTS

| CN | 101599055 A | 12/2009 |
| CN | 103703427 A | 4/2014 |

(Continued)

OTHER PUBLICATIONS

International Search Report dated Jul. 21, 2015, of the corresponding International Application PCT/EP2015/060489 filed May 12, 2015.

*Primary Examiner* — Rodney A Butler
(74) *Attorney, Agent, or Firm* — Norton Rose Fulbright US LLP; Gerard Messina

(57) ABSTRACT

A method for processing data for a driving function of a vehicle is described, a predefined quantity of computation units being provided; the computation units supplying data, in particular redundant data, to a decision unit; the decision unit deciding, based on a comparison of the data delivered by the computation units, whether the data are correct; a synchronization unit being provided; the synchronization unit synchronizing the computation units in such a way that the computation units deliver the data to the decision unit in a specified time period; and the synchronization unit informing the decision unit as to when the data are transmitted by the computation units, so that the decision unit can specify which data of the computation units are used for a check of the data.

10 Claims, 5 Drawing Sheets

(51) Int. Cl.
    *G05D 1/00*            (2006.01)
    *B60W 50/023*       (2012.01)
    *G06F 11/10*         (2006.01)

(52) U.S. Cl.
    CPC ...... *B60W 2556/00* (2020.02); *G06F 11/1004* (2013.01); *G06F 11/1641* (2013.01); *G06F 2201/83* (2013.01)

(56) References Cited

FOREIGN PATENT DOCUMENTS

| EP | 0348368 A1 | 12/1989 |
| EP | 2113842 A1 | 11/2009 |

METHOD FOR PROCESSING DATA FOR A DRIVING FUNCTION OF A VEHICLE

FIELD

The present invention relates to a method for processing data for a driving function of a vehicle, a decision unit for processing data, a computation unit for processing data, and a system for processing data.

BACKGROUND INFORMATION

Conventional driver assistance systems for a highly automated driving include computer systems which are technically complex, and require a high level of computing performance and a large memory. In addition, critical faults must be recognized and operation must be transferred into a safe state.

SUMMARY

An object of the present invention is to furnish an improved method for processing data for a driving function of a vehicle, an improved decision unit, an improved computation unit, and an improved system for processing data for a driving function of a vehicle.

An advantage of example embodiments of the present invention is that stringent requirements for functional safety and failure rate can be satisfied with simple means. This is achieved by the fact that a synchronization unit is provided which synchronizes several computation units and the decision unit. The synchronization unit synchronizes the computation units in such a way that the computation units deliver the data to the decision unit in a specified time period. In addition, the decision unit is informed by the synchronization unit as to when the data are transmitted by the computation units. The decision unit can thus accurately specify which data of the computation units are to be used for checking the correctness of a specified quantity of data.

The example decision unit in accordance with the present invention is configured to obtain a synchronization signal from a synchronization unit, the synchronization signal indicating that specified data of the computation units are being conveyed to the decision unit in a specified time period. The decision unit can thus accurately specify which data of the computation units are to be used in order to check the correctness of the data.

A computation unit is provided in accordance with the present invention which is configured to receive a synchronization signal from a synchronization unit, the synchronization signal indicating that the computation unit is to convey data to the decision unit in a specified time period. The computation unit can thereby synchronize the delivery of the data with reference to the specified time period.

Further embodiments are described herein.

In an embodiment, the synchronization unit conveys synchronization signals to the computation unit and to the decision unit. For example, electrical signals can be transferred via a signal lead, and/or data signals via a data interface, as synchronization signals. Known and reliable signals and transfer routes can thus be used for transfer of the synchronization signals.

In a further embodiment, the synchronization unit conveys a synchronization signal via a respective signal lead or via a respective data interface of each computation unit. Security is thereby improved for data transfer between the synchronization unit and the computation unit.

In a further embodiment, the synchronization unit conveys a synchronization signal via several signal leads and/or via several data interfaces of a respective computation unit. Enhanced redundancy for secure transfer of the synchronization signal is thereby achieved. Security is thereby enhanced for correct transfer of the synchronization signal.

In a further embodiment, the synchronization unit starts processing of a task in the computation units. Thus not only can the time-related delivery of data from the computation unit to the decision unit be controlled by way of the synchronization unit, but processing of the data is also synchronized between the computation units. A further improvement in synchronization of the individual computation units is thereby achieved.

In a further embodiment, synchronization is improved by the fact that a number of a current synchronization cycle is conveyed from the synchronization unit to the computation units and to the decision unit. Enhanced flexibility in the context of synchronization of the data of various tasks can be achieved by assigning a number to a synchronization cycle. In a further embodiment, the computation units convey to the synchronization unit, via a reply interface, the information as to which input data are received in what sequence. A further improvement in synchronization is thereby achieved.

In a further embodiment, the synchronization unit conveys to the computation units, via a control interface, the information as to which of the received input data are being processed in a subsequent task or in which task, the synchronization unit specifying in particular a sequence of tasks and/or a beginning of the respective task and/or the input data belonging to the tasks. A further increase in the precision of the synchronization of the computation units is thereby achieved.

In a further embodiment, the reply interface is configured in the form of several interfaces between each computation unit and the synchronization unit. In addition, depending on the embodiment selected, the interface can be configured in the form of a bidirectional interface and/or in the form of a multi-master-capable bus interface and/or in the form of a unidirectional interface. These measures also enhance the fail-safe performance of the system.

In a further embodiment, the computation units convey checksums of the input data to the synchronization unit via the reply interface. Data transfer is thereby simplified, since it is not the data themselves but only the checksums that need to be conveyed.

In a further embodiment, the input data are grouped into time-related blocks and the checksums are each calculated over one time-related block. Simple and unambiguous calculation of the checksum can thereby be achieved.

In a further embodiment, the data are received in the form of messages. A quantity of messages for the received data is incorporated into the checksum. The quantity of messages is counted, for example, with the aid of a message counter when the data are received via a network such as, for example, CAN, FlexRay, Ethernet.

In a further embodiment, the input data are equipped with a time stamp, the time stamps being incorporated into the checksum. A further increase in synchronization precision is thereby achieved.

In a further embodiment, the input data are received from the computation units via a network interface, the input data having network checksums and the network checksums being incorporated into the checksum calculation.

A system for processing data for a driving function of a vehicle is also proposed, the system having a predefined quantity of computation units, a decision unit, and a synchronization unit.

The computation units are configured to supply data to the decision unit. The decision unit is configured to decide, based on the delivered data of the various computation units, whether the data are correct and can be used for the driving function of the vehicle. The synchronization unit is further configured to synchronize the computation units in such a way that the computation units transmit the data to the decision unit in a specified time period. The synchronization unit is furthermore configured to inform the decision unit as to when the data are transmitted from the computation units to the decision unit. The decision unit can thus specify which data of the computation units are used to check a data item.

In an embodiment, the system can use electrical signals via a signal lead and/or data signals via a data interface as synchronization signals.

In a further embodiment, the system can have a synchronization unit, the synchronization unit being connected to each of the computation units via a respective signal lead or data interface.

In a further embodiment, the synchronization unit of the system can be connected to each of the computation units via several data interfaces and/or via several data interfaces.

In a further embodiment, the synchronization unit of the system can be configured to start processing of a task in the computation units.

In a further embodiment, the synchronization unit of the system can be configured to convey a number of a current sync cycle to the computation units and to the decision unit.

In a further embodiment, the computation units of the system can be configured to convey to the synchronization unit, via a reply interface, which input data were received in what sequence.

In a further embodiment of the system, the reply interface can be configured in the form of a unidirectional interface and/or in the form of a bidirectional interface and/or in the form of a multi-master-capable bus interface and/or in the form of several redundant unidirectional interfaces and/or in the form of several redundant bidirectional interfaces and/or in the form of several redundant multi-master-capable bus interfaces.

In a further embodiment of the system, the synchronization unit is configured to inform the computation units, via a control interface, as to which of the received input data are to be processed in a subsequent task, the synchronization unit being configured in particular to specify a sequence of tasks and/or a time-related beginning of the respective task.

In a further embodiment of the system, the computation units are configured to calculate checksums of the input data and to convey the checksums to the synchronization unit.

The present invention is explained in further detail below with reference to the Figures.

DETAILED DESCRIPTION OF EXAMPLE EMBODIMENTS

An object of the present invention is to implement synchronization between a decision unit and several computation units in such a way that synchronicity exists between the computation units, and optionally that the input data on the computation units and the decision unit are synchronized. The results calculated from the input data are thus synchronized for comparison in the decision unit. In addition, restarting and resynchronization of individual computation units should optionally be possible. As one example embodiment, a synchronization unit is provided which performs the mutual synchronization among the computation units and the synchronization of the computation units with the decision unit. An advantage of the system described, and of the method described, is that the decision unit can decide unambiguously, based on a synchronization information item of the synchronization unit, which data can be utilized for verifying the correctness of the data of the computation units. The method additionally makes possible an increase in availability as a result of restarting (the system is completely available again after a successful restart of individual computation units recognized as faulty). The method ensures that this kind of individual restarting of individual computation units is possible.

An object of the decision unit is, for example, to check, from a predefined quantity N of data of a quantity N of computation units, whether the data conveyed from the N computation units are correct. In the simplest case the same input data are received, and the same tasks processed, by the computation units, so that the data of the computation units which are conveyed to the decision unit should be identical. If the decision unit recognizes that the data of the N computation units are identical, the data are then recognized as correct and are used for the driving function of the vehicle, in particular for an automatic driving function of the vehicle.

For a precise check of the data of the various computation units, it is advantageous if the computation units are precisely synchronized with one another and the computation units are precisely synchronized with the decision unit. In the event of discrepancies in synchronization, defective recognition of fault situations by the decision unit can occur, so that the failure rate of the computer system is increased.

Figure 1:
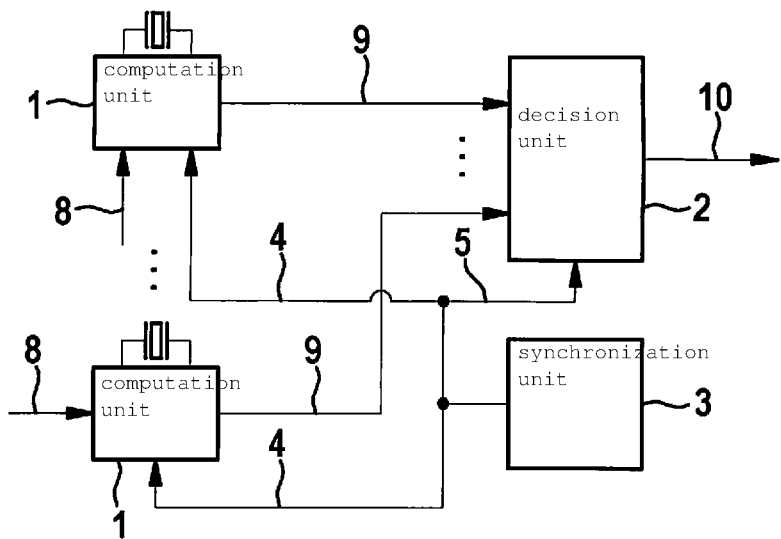
FIG. 1 shows a first embodiment of an integrated computer system.

FIG. 1 schematically depicts a computer system made up of a quantity N of computation units 1 that are in communication with a decision unit 2 and with a synchronization unit 3. Synchronization unit 3 is connected to decision unit 2 via a first data connection 4. In addition, each computation unit 1 is connected to decision unit 2 via a further respective data connection 9. The N computation units 1 thus supply N data, in parallel, to decision unit 2. Synchronization unit 3 furthermore conveys synchronization signals to computation units N via first data connection 4, and to decision unit 2 via second data connection 5. First and second data connection 4, 5 can also be configured in part as a common data connection or as separate data connections. Each computation unit 1 furthermore has an input 8 for the reception of input data. Computation units 1 use the input data in order to execute, in particular to calculate, predefined tasks. The results of the tasks are transferred to decision unit 2 as data via the further data connections 9. Decision unit 2 has an output 10 by way of which a data item or data recognized as correct, and/or the information that a data item is correct, is outputted. The output of decision unit 2 is used, for example, to perform a driving function of a vehicle, for example autonomous driving or steering of the vehicle.

The synchronization signals can be transferred in the form of electrical signals via electrical leads. In this embodiment the second data connections are thus configured in the form of electrical leads. Synchronization of computation units 1 and decision unit 2 is implemented, for example, by the fact that tasks of the computation units are started by way of a synchronization signal. The electrical signal can start the pertinent task processing of the computation units, for example, with the aid of a level change, for example by way of an interrupt.

Figure 3:
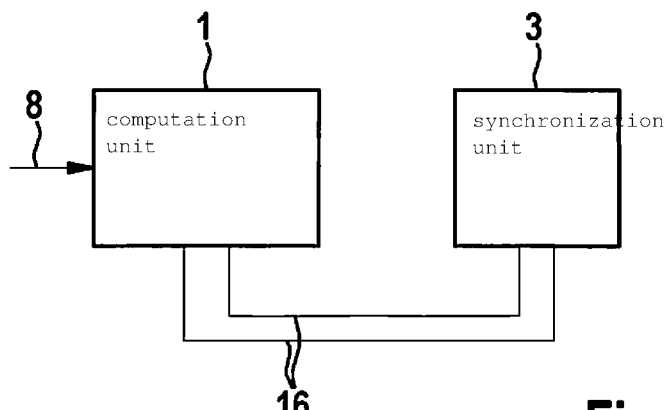
FIG. 3 shows a further embodiment for the data connection between a synchronization unit and a computation unit.

In a further embodiment, the synchronization signal is transferred, for example serially, via a data interface (FIG. 3).

In a further embodiment, the synchronization signals are transferred in parallel fashion via a data interface.

Figure 5:
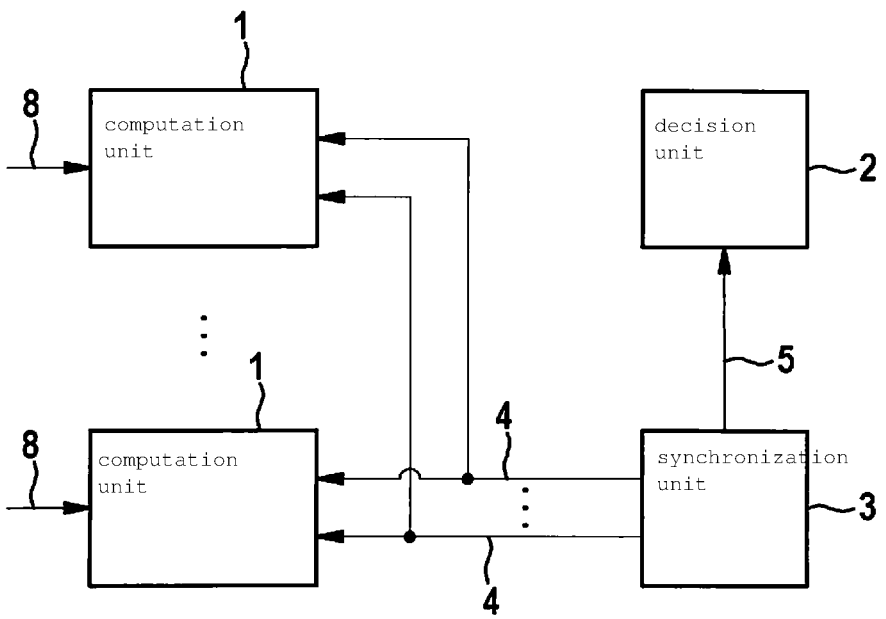
FIG. 5 shows a further embodiment of an integrated computer system.

In a further embodiment (FIG. 2), the synchronization signal can be transferred in parallel fashion, in the form of an analog or digital signal, via several leads or data connections, each respective lead or data connection having part of the synchronization signal. Combinations of the above-described transfer methods can also be used; synchronization unit 3 can be in communication with each of the quantity N of computation units 1 via a quantity N of respective separate data connections or interfaces. Fail-safe performance is thereby enhanced (FIG. 5).

Depending on the embodiment selected, the tasks of computation units 1 can be started by synchronization unit 3.

In a further embodiment, in addition to transfer of the synchronization signal by synchronization unit 3, a number of a current synchronization cycle is conveyed to the N computation units 1 and to decision unit 2. A reset line of the computation units can be used for signaling the synchronization signal and/or for signaling the number of the current synchronization cycle. For example, upon a reset signal the number of the synchronization cycle can be set to a predetermined value, for example 0.

In a further embodiment, an additional lead can set the number of the current synchronization cycle in the N computation units and in the decision unit to a predetermined value, for example to the value 0, for example via a level change and thus via additional signaling that a setting state has been reached.

In addition, in a further embodiment the synchronization signal can be transferred in the selected data connections by way of an additional code, the code setting the number of the synchronization cycle in the N computation units and in the decision unit to a predetermined value, for example to the value 0.

In a further embodiment, the number of the synchronization cycle can be additionally transferred and can be established by synchronization unit 3.

Figure 6:
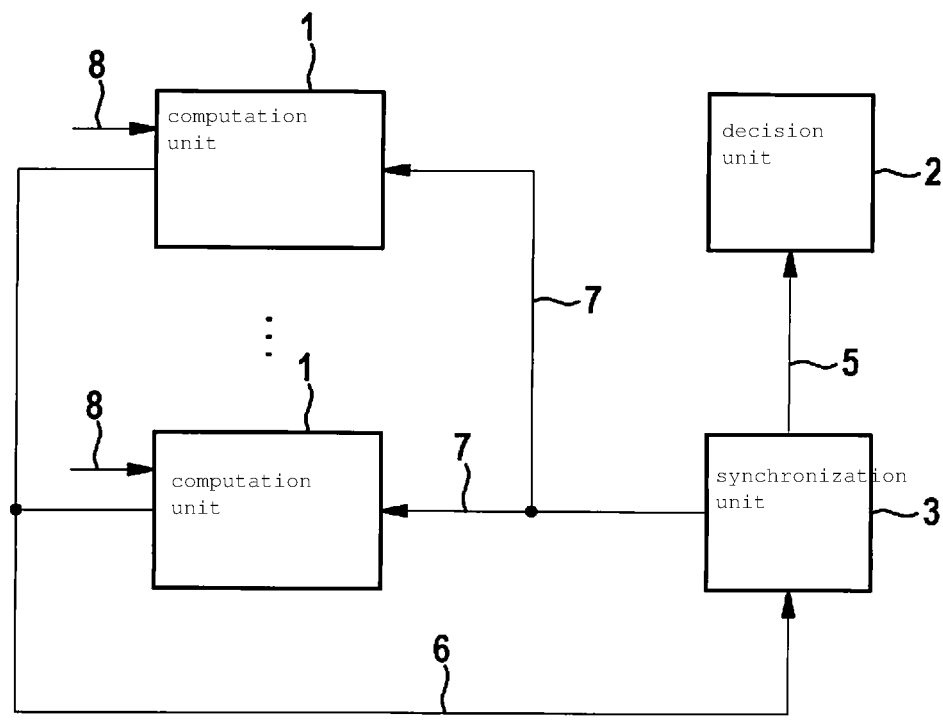
FIG. 6 shows a further embodiment for an integrated computer system.
Figure 7:
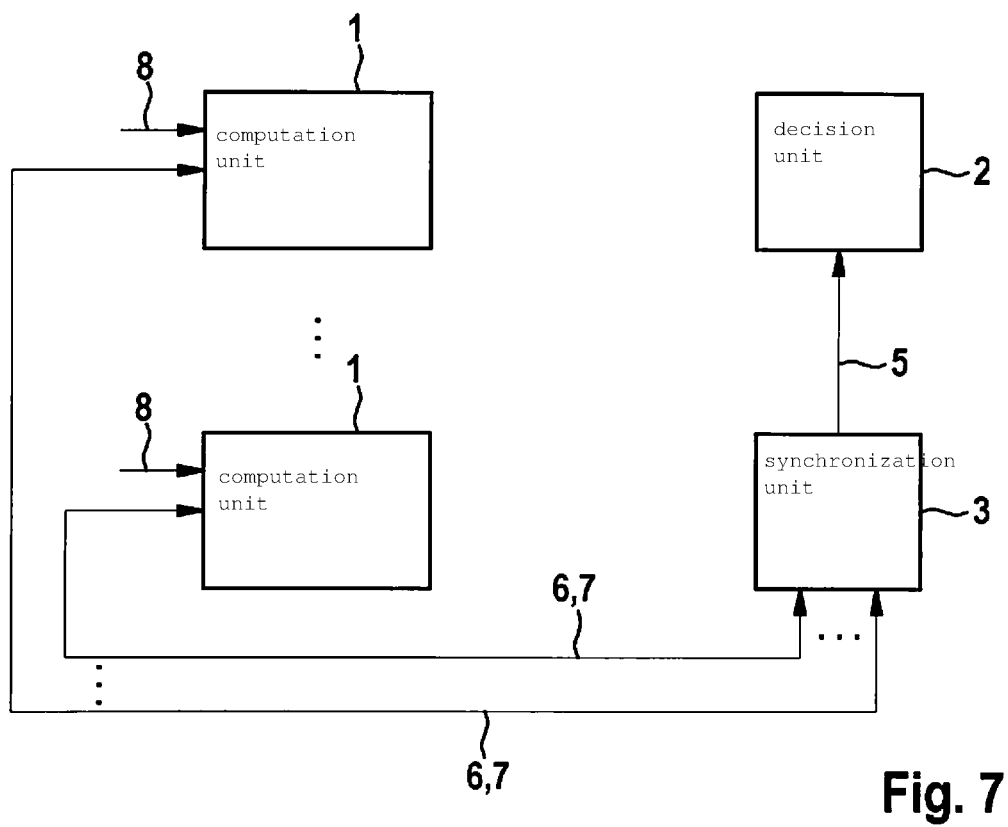
FIG. 7 shows a further embodiment for an integrated computer system.

In a further embodiment, the N computation units 1 additionally have a reply interface to synchronization unit 3 (FIGS. 6, 7). The computation units can transfer via the reply interface the information as to which input data have been received, in what time-related sequence, by the individual computation units 1. As a rule, all computation units 1 receive the same input data. Based on the information obtained via the reply interface, synchronization unit 3 can ascertain which input data have already been received on all N computation units 1.

A control interface can additionally be provided between synchronization unit 3 and the computation units (FIG. 6). The synchronization unit informs computation units 1 via the interface unit, for example, as to which of the previously received input data need to be processed in the next task or tasks. It is thereby possible to ensure that all N computation units 1 use the same input data in the pertinent tasks. Depending on the embodiment selected, the synchronization unit can specify both the sequence of the tasks and/or the beginning of the tasks and/or the input data belonging to the tasks. It is thereby possible to ensure that all N computation units are working with the same data.

Figure 2:
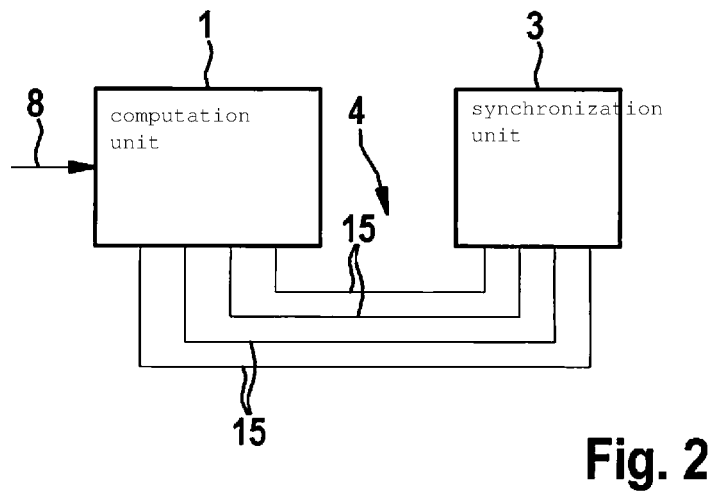
FIG. 2 shows an embodiment for a data connection between a synchronization unit and a computation unit.

Depending on the embodiment selected, the reply interface can be implemented, for example, by N separate data interfaces from the N computation units 1 to synchronization unit 3 (FIG. 2). The control interface can furthermore be configured additionally in the form of N separate data interfaces from synchronization unit 3 to the N computation units 1. Depending on the embodiment selected, the control interface and the reply interface can be implemented via one common bidirectional interface (FIG. 7). The control interface can furthermore be implemented via previously existing first data connections 4 of synchronization unit 3. In a further embodiment, the N reply interfaces can be grouped into one multi-master-capable bus interface, for example CAN, I2C, bus arbiter, and so forth (FIG. 7).

In a further embodiment, the control interface can be configured via one common one-to-N unidirectional interface, for example CAN, SPI, I2C, BUS, etc.

In a further embodiment, the multi-master-capable bus interface can be configured in the form of a specified quantity M of redundant multi-master-capable bus interfaces. Fail-safe performance is thereby enhanced.

In a further embodiment, the unidirectional interface can be configured in the form of a quantity M of redundant unidirectional interfaces. A combination of the above-described data connections can also be implemented.

In a further embodiment, unique checksums of the input data can be conveyed to synchronization unit 3 via the reply interface. The amount of data to be transferred is thereby considerably reduced. It is no longer necessary to transfer the input data themselves. The unique checksums are also conveyed via the control interface from synchronization unit 3 to the N computation units 1. The input data which are to be processed, and in which tasks, are thereby specified. The checksums must be unique for the N computation units. This can be achieved, for example, by the fact that the input data are grouped into time-related blocks, and the checksum is calculated over the entire block. In a further embodiment, message counters can be incorporated into the checksum calculation. Message counters are provided as a rule, for example, when the input data are received via the network, for example CAN, FlexRay, Ethernet, etc. In a further embodiment, a time stamp that belongs to the input data can additionally be incorporated into the checksum calculation. This time stamp must be created, if applicable, from the synchronization information or at least synchronized with it.

Upon reception via a network interface, the network checksums belonging to the data can be incorporated into the checksum calculation. Combinations of the above-described methods can also be used.

FIG. 2 shows a portion of an integrated computer system in which a computation unit 1 is connected to synchronization unit 3 via M separate data connections 4 in the form of electrical leads 15. Fail-safe performance is thereby enhanced. The other computation units are likewise connected to synchronization unit 3 in the same manner.

FIG. 3 shows a portion of an integrated computer system in which synchronization unit 3 is connected to a computation unit 1 via two redundant data interfaces 16. The other computation units are likewise connected to synchronization unit 3 in the same manner. The data interface can transfer the synchronization signals, for example, serially.

Figure 4:
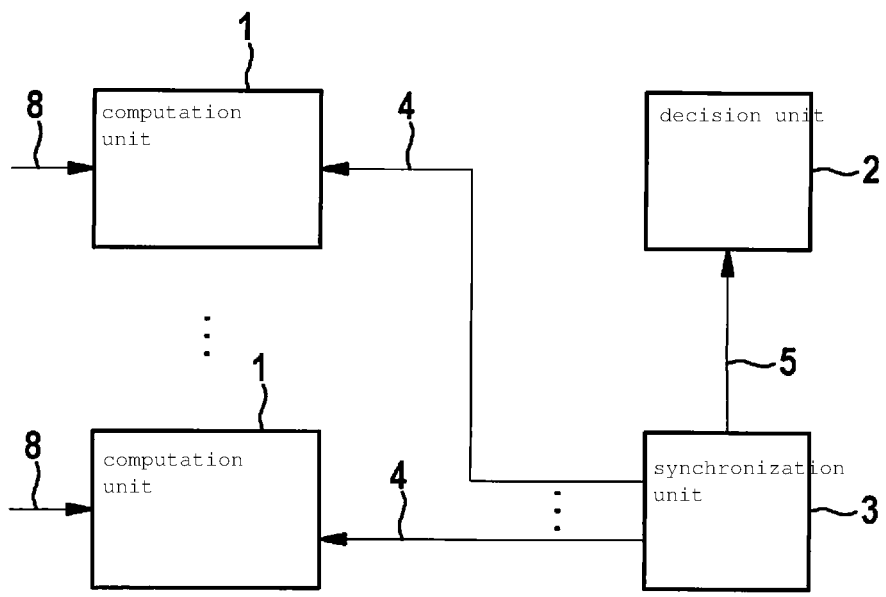
FIG. 4 shows a further embodiment of an integrated computer system.

FIG. 4 shows a quantity N of computation units 1, each computation unit 1 being connected to synchronization unit 3 via a separate first data connection 4. Synchronization unit 3 is connected to decision unit 2 via a second data connection 5.

FIG. 5 schematically depicts an implementation of an integrated computer system, the quantity N of computation units 1 being connected to synchronization unit 3 via a quantity M of redundant interfaces. The number M is preferably selected to be less than the quantity N, but greater than 1.

FIG. 6 schematically depicts an integrated computer system in which the quantity N of computation units 1 is connected to synchronization unit 3 via a common reply interface 6. Synchronization unit 3 is furthermore in communication with the N computation units 1 via a common control interface 7.

FIG. 7 shows a further embodiment in which each of the N computation units 1 is connected to synchronization unit 2 respectively via a reply interface 6 and a control interface 7. Reply interface 6 and control interface 7 are embodied as bidirectional interfaces.

For better clarity, the further data connections 9 between computation units 1 and decision unit 2 are not depicted in FIGS. 4 to 7. The N computation units 1 transfer the N data to decision unit 2 in parallel fashion via further data connections 9. The quantity N of computation units can be greater than the quantity 2.

Figure 8:
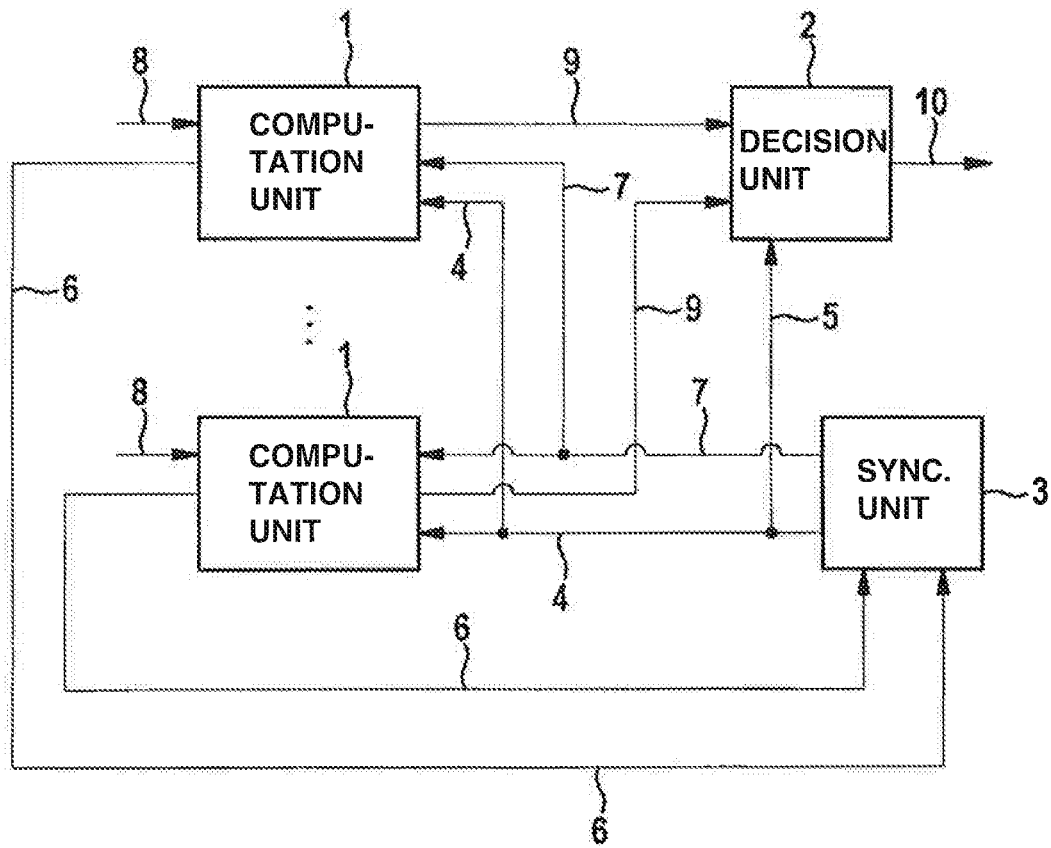
FIG. 8 shows an additional embodiment for an integrated computer system.

FIG. 8 is a further schematic depiction of an integrated computer system having the quantity N of computation units 1 that receive input data via inputs 8. Each computation unit 1 is furthermore in communication with decision unit 2 via a further data connection 9. Synchronization unit 3 is furthermore connected to the N computation units and to decision unit 2 via the respective first and second data connection 4, 5. The N computation units 1 are also connected to synchronization unit 3 via reply interfaces 6. Synchronization unit 3 is also connected to the N computation units via control interfaces 7.

Decision unit 2 has an output 10 through which data item or data recognized as correct, and/or the information that a data item is correct, is outputted. The output of decision unit 2 is used, for example, in order to use the data of the computation units for a driving function of a vehicle, for example autonomous driving or steering of the vehicle.

Figure 9:
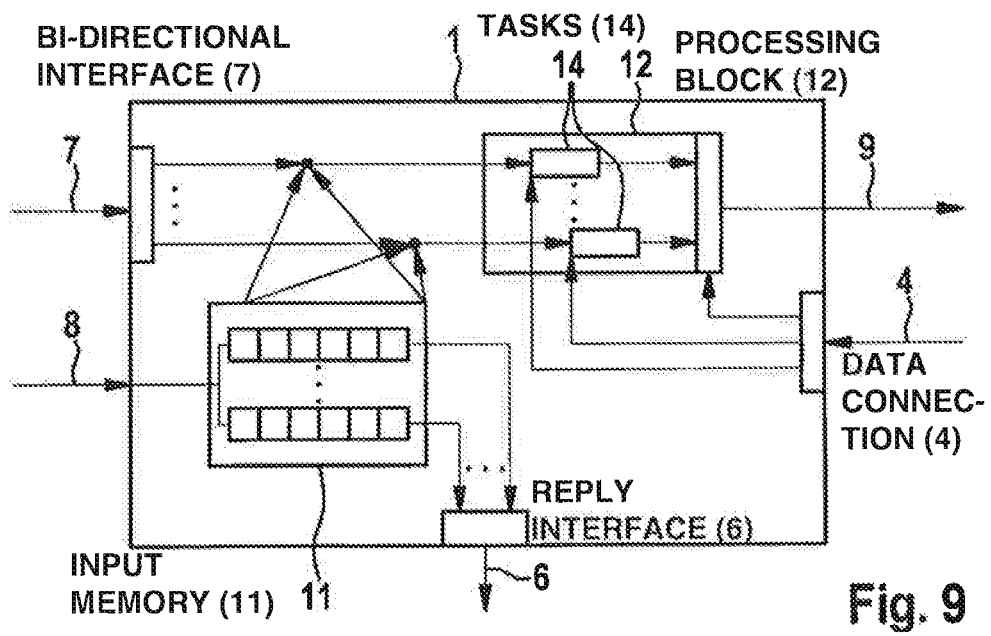
FIG. 9 schematically depicts execution of a task in a computation unit.

FIG. 9 schematically depicts an operating mode of a computation unit 1. Computation unit 1 receives, via an input 8, input data that are loaded into an input memory 11. Depending on the embodiment selected, computation unit 1 forwards the stored input data themselves, or a checksum of the stored input data, to synchronization unit 3 via reply interface 6. Computation unit 1 furthermore receives via control interface 7 the information as to which input data need to be used for the processing of tasks 14, in particular which tasks 14.

Computation unit 1 correspondingly uses the specified input data to execute specified tasks 14 in a processing block 12. Computation unit 1 furthermore receives, via first data connection 4, a synchronization signal that specifies the start for carrying out task 14 and/or the time for conveying the result of task 14 to decision unit 2 via further data connection 9. Depending on the embodiment selected, only the point in time for transferring the result of task 14 to decision unit 2, or the starting point for carrying out task 14, can be specified by synchronization unit 3 with the aid of the synchronization signal.

Figure 10:
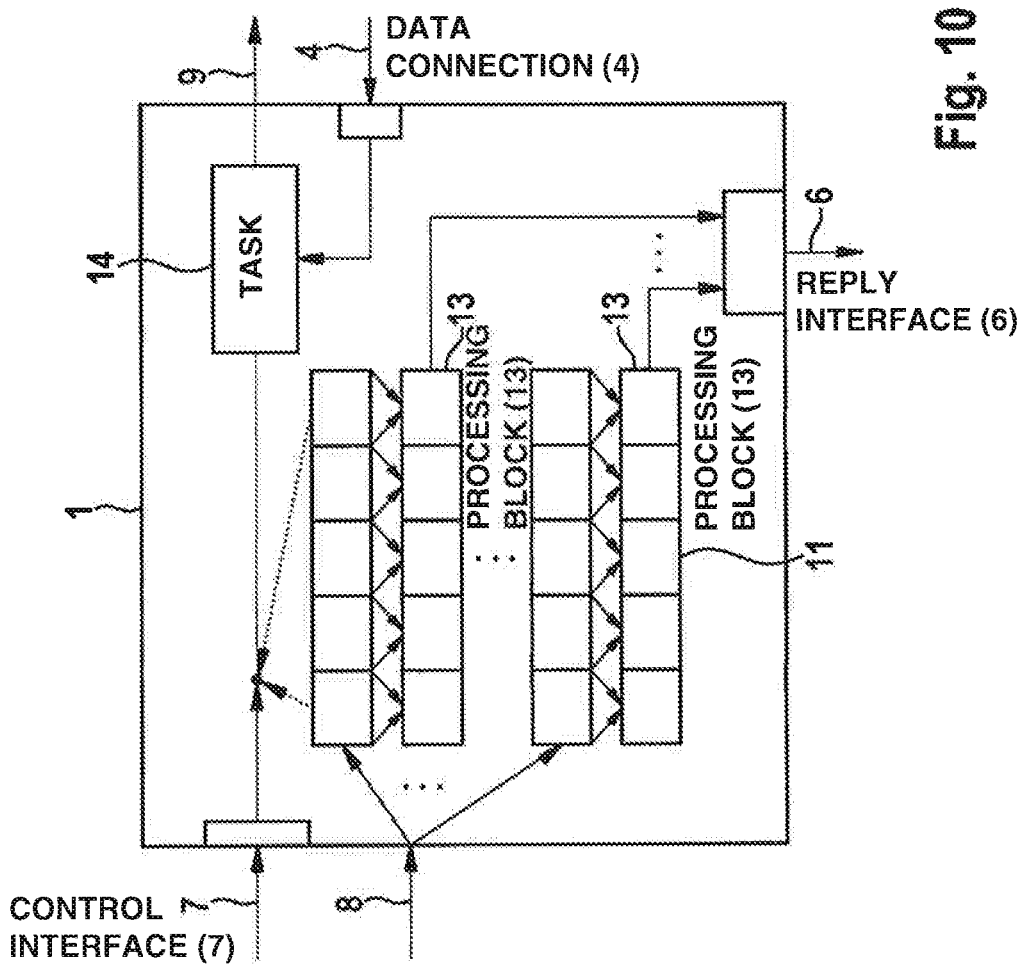
FIG. 10 schematically depicts execution of a further task in a computation unit.

FIG. 10 shows a further embodiment of a computation unit 1 that is constructed substantially in accordance with the embodiment of FIG. 9, except that in a second processing block 13 computation unit 1 ascertains a checksum from the input data stored in input memory 11, and forwards the checksum to synchronization unit 3 via reply interface 6.

The input data can be grouped into time-related blocks, and the checksum can be calculated over one respective block.

The input data can furthermore be received serially in the form of multiple messages. The messages can be counted, and the quantity of messages can be incorporated into the calculation of the checksum. The input data can moreover be provided with a time stamp. The time stamp can likewise be incorporated into the calculation of the checksum. The input data can furthermore be received from the computation units via a network interface, the input data having network checksums. The network checksums can also be incorporated into the checksum calculation.

What is claimed is:

1. A method for processing data for a driving function of a vehicle, using a predefined quantity of computers which supply redundant data, the method comprising:
supplying the redundant data to a processor;
deciding, by the processor based on a comparison of the data delivered whether the data are correct;
synchronizing the computers to deliver the data to the processor in a specified time period;
informing the processor as to when the data are transmitted, so that the processor can specify which data are used for a check of the data; and
informing the computers, by the synchronizing via a control interface, as to which of received input data are processed in a subsequent task, and specifying at least one of a sequence of tasks and a beginning of the respective task.

2. The method as recited in claim 1, wherein synchronization signals are conveyed to the computers and to the processor.

3. The method as recited in claim 2, wherein at least one of: i) electrical signals being transferred via a signal lead as the synchronization signals, and ii) data signals being transferred via a data interface as the synchronization signals.

4. The method as recited in claim 2, wherein the synchronizing is provided to each of the computers via a respective signal line or a data interface.

5. The method as recited in claim 2, wherein the synchronizing is provided to each of the computers at least one of: i) via a plurality of signal leads, and ii) via a plurality of data interfaces.

6. The method as recited in claim 1, further comprising: starting, by the synchronizing, processing of a task in the computers.

7. The method as recited in claim 1, further comprising: conveying to the computers and to the processor, by the synchronizing, a number of a current synchronization cycle.

8. The method as recited in claim 1, wherein the computers convey checksums of the input data.

9. The method as recited in claim 8, wherein at least one of: i) the input data are grouped into time-related blocks and the checksums each being calculated over one block, ii) a quantity of messages, in which the input data are received, are incorporated into the checksum, iii) the input data are equipped with a time stamp, and the time stamps being incorporated into the checksum; and iv) the input data being received from the computers via a network interface, the input data having network checksums and the network checksums being incorporated into the checksum calculation.

10. A processor unit for processing data for a driving function of a vehicle, comprising:
a processor for processing the data for the driving function of the vehicle, using a predefined quantity of computers which supply redundant data, by performing the following:
supplying the redundant data to a processor;
deciding, by the processor based on a comparison of the data delivered whether the data are correct;
synchronizing the computers to deliver the data to the processor in a specified time period;
informing the processor as to when the data are transmitted, so that the processor can specify which data are used for a check of the data; and
informing the computers, by the synchronizing via a control interface, as to which of received input data are processed in a subsequent task, and specifying at least one of a sequence of tasks and a beginning of the respective task.

* * * * *